United States Patent
Chen et al.

(10) Patent No.: US 10,242,201 B1
(45) Date of Patent: Mar. 26, 2019

(54) SYSTEMS AND METHODS FOR PREDICTING SECURITY INCIDENTS TRIGGERED BY SECURITY SOFTWARE

(71) Applicant: Symantec Corporation, Mountain View, CA (US)

(72) Inventors: Shang-Tse Chen, Atlanta, GA (US); Chris Gates, Culver City, CA (US); Yufei Han, Biot (FR); Michael Hart, Culver City, CA (US); Kevin Roundy, Culver City, CA (US)

(73) Assignee: Symantec Corporation, Mountain View, CA (US)

( * ) Notice: Subject to any disclaimer, the term of this patent is extended or adjusted under 35 U.S.C. 154(b) by 176 days.

(21) Appl. No.: 15/292,837

(22) Filed: Oct. 13, 2016

(51) Int. Cl.
*G06F 21/57* (2013.01)
*G06N 99/00* (2019.01)

(52) U.S. Cl.
CPC ......... *G06F 21/577* (2013.01); *G06N 99/005* (2013.01); *G06F 2221/034* (2013.01)

(58) Field of Classification Search
CPC ............ G06F 21/577; G06F 2221/033; G06N 99/005
See application file for complete search history.

(56) References Cited

U.S. PATENT DOCUMENTS

| | | | | |
|---|---|---|---|---|
| 2008/0301783 | A1* | 12/2008 | Abrutyn | H04L 29/12207 726/5 |
| 2010/0192222 | A1* | 7/2010 | Stokes | G06F 21/563 726/22 |
| 2012/0303558 | A1* | 11/2012 | Jaiswal | G06N 99/005 706/12 |
| 2014/0143879 | A1* | 5/2014 | Milman | H04L 63/1433 726/25 |
| 2016/0103992 | A1* | 4/2016 | Roundy | G06F 21/554 726/23 |
| 2016/0335432 | A1* | 11/2016 | Vatamanu | G06F 21/552 |

OTHER PUBLICATIONS

IBM Managed Security Services, accessed Oct. 11, 2016: www.ibm.com/security/services/managed-security-services/; Aug. 4, 2015.
Trustwave, founded 1995, accessed Oct. 11, 2016: https://www.trustwave.com/Services/; Feb. 23, 2003.

\* cited by examiner

*Primary Examiner* — Kevin Bechtel
*Assistant Examiner* — Hakeem D Sulaimon
(74) *Attorney, Agent, or Firm* — FisherBroyles, LLP (57) ABSTRACT

A computer-implemented method for predicting security incidents triggered by security software may include (i) collecting, by a computing device, telemetry data from a set of security products deployed by a set of client machines, (ii) identifying, by the computing device, a selected security product within the set of security products that is missing telemetry data for a target client machine, (iii) building a classifier, by the computing device using the telemetry data, that predicts information about security incidents triggered by the selected security product, (iv) determining, by the computing device and based on the classifier, that the selected security product triggers a new security incident on the target client machine, and (v) performing a security action, by the computing device, to secure the target client machine against the new security incident. Various other methods, systems, and computer-readable media are also disclosed.

20 Claims, 6 Drawing Sheets

SYSTEMS AND METHODS FOR PREDICTING SECURITY INCIDENTS TRIGGERED BY SECURITY SOFTWARE

BACKGROUND

Managed security services (MSS) often use a suite of security software that protect against various types of computer security breaches. However, MSS clients may not require all of the security products that are available from an MSS provider. For example, a client may have limited security needs and only deploy one or two products to maintain a minimal amount of computer security. Other clients, such as larger corporations, may be susceptible to more types of attacks, and multiple products may be needed to protect against these different types of attacks.

Typically, MSS clients review the security products offered by an MSS provider to determine which products are best for them. In some cases, clients may not understand the benefits of certain products and may not realize when a product would be useful. Furthermore, even within a single security product, there may be different rules for triggering various security incidents that apply in different situations. This may cause even more confusion for clients in trying to understand how potential security incidents are detected. The MSS provider may not be able to clearly explain to clients the advantages of deploying certain security products in contrast to alternative products. Accordingly, the instant disclosure identifies and addresses a need for additional and improved systems and methods for demonstrating the value of a security product for a client.

SUMMARY

As will be described in greater detail below, the instant disclosure describes various systems and methods for predicting security incidents triggered by security software. In one example, a computer-implemented method for predicting security incidents triggered by security software may include (i) collecting, by a computing device, telemetry data from a set of security products deployed by a set of client machines, (ii) identifying, by the computing device, a selected security product within the set of security products that is missing telemetry data for a target client machine, (iii) building a classifier, by the computing device using the telemetry data, that predicts information about security incidents triggered by the selected security product, (iv) determining, by the computing device and based on the classifier, that the selected security product triggers a new security incident on the target client machine, and (v) performing a security action, by the computing device, to secure the target client machine against the new security incident.

In one embodiment, the telemetry data may include a security incident, a type of the security incident, and/or a severity of the security incident. Additionally or alternatively, the telemetry data may include a security signature related to the security incident generated by a security product.

In some examples, building the classifier may include grouping telemetry data by each security product within the set of security products for each client machine on a single day and training a machine learning model to predict the security incidents in the missing telemetry data. In these examples, training the machine learning model may include using security signatures from other security products as features, using whether a security incident is triggered by the selected security product as a label, and predicting whether the missing telemetry data contains a security incident. In other examples, training the machine learning model may include using security signatures from other security products as features, using a type of security incident as a label, and predicting a type of security incident in the missing telemetry data. Additionally or alternatively, training the machine learning model may include estimating each security signature generated by each security product and predicting a security signature generated by the selected security product in the missing telemetry data.

In some embodiments, determining that the selected security product generates the new security incident may include determining that the telemetry data does not include the new security incident. Additionally, determining that the selected security product generates the new security incident may include using the classifier to predict the new security incident in the missing telemetry data.

In one example, performing the security action may include alerting an administrator about the new security incident and/or alerting a client about the new security incident. Additionally or alternatively, performing the security action may include deploying the selected security product on the target client machine and/or providing a security product recommendation to the client.

In one embodiment, a system for implementing the above-described method may include (i) a collection module, stored in memory, that collects, by a computing device, telemetry data from a set of security products deployed by a set of client machines, (ii) an identification module, stored in memory, that identifies, by the computing device, a selected security product within the set of security products that is missing telemetry data for a target client machine, (iii) a classification module, stored in memory, that builds a classifier, by the computing device using the telemetry data, that predicts information about security incidents triggered by the selected security product, (iv) a determination module, stored in memory, that determines, by the computing device and based on the classifier, that the selected security product triggers a new security incident on the target client machine, and (v) a performance module, stored in memory, that performs a security action, by the computing device, to secure the target client machine against the new security incident. In addition, the system may include at least one processor that executes the collection module, the identification module, the classification module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) collect, by the computing device, telemetry data from a set of security products deployed by a set of client machines, (ii) identify, by the computing device, a selected security product within the set of security products that is missing telemetry data for a target client machine, (iii) build a classifier, by the computing device using the telemetry data, that predicts information about security incidents triggered by the selected security product, (iv) determine, by the computing device and based on the classifier, that the selected security product triggers a new security incident on the target client machine, and (v) perform a security action, by the computing device, to secure the target client machine against the new security incident.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for predicting security incidents triggered by security software. As will be explained in greater detail below, by building a classifier using telemetry data, the systems and methods described herein may predict the security events that would be triggered by a security product for a client machine, whether or not the security product is deployed by the client machine. For example, by using collaborative filtering for matrix completion, the disclosed systems and methods may train a classifier to recognize security signatures leading to the detection of a security incident. Furthermore, by using these techniques to predict security incidents for a client device, the disclosed systems and methods may recommend a specific security product that may be useful for a client.

In addition, the systems and methods described herein may improve the functioning of a computing device by catching security incidents that are not triggered due to missing or corrupted data. These systems and methods may also improve the field of MSS and/or computer security by providing clients with tailored product recommendations and displaying relevant security signatures that may contribute to security incidents.

Figure 1:
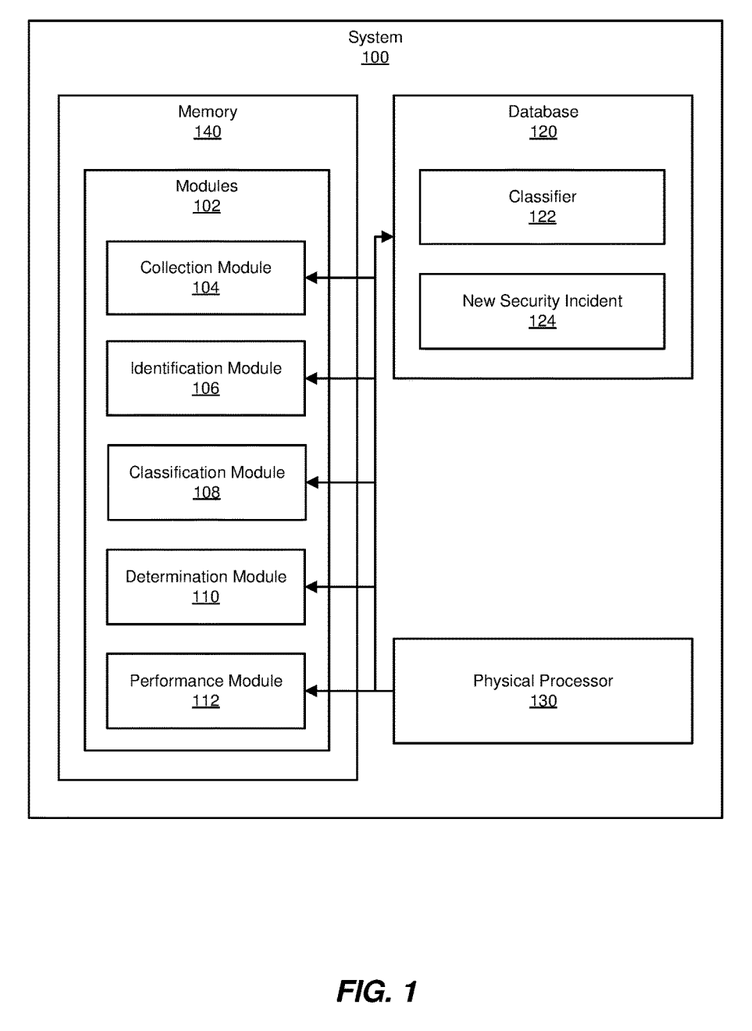
FIG. 1 is a block diagram of an example system for predicting security incidents triggered by security software.
Figure 2:
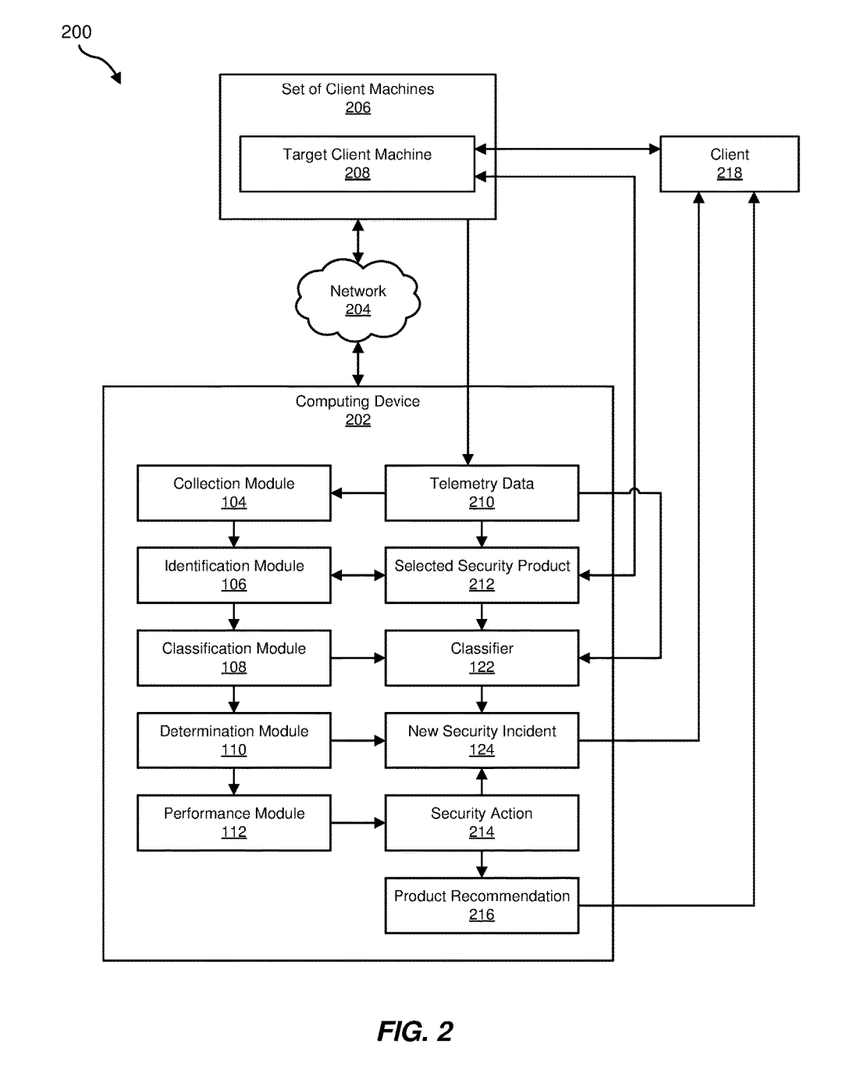
FIG. 2 is a block diagram of an additional example system for predicting security incidents triggered by security software.

The following will provide, with reference to FIGS. 1 and 2, detailed descriptions of example systems for predicting security incidents triggered by security software. Detailed descriptions of corresponding computer-implemented methods will also be provided in connection with FIG. 3. In addition, detailed descriptions of an example classifier for predicting an example new security incident will be provided in connection with FIG. 4. Furthermore, detailed descriptions of an example computing system and network architecture capable of implementing one or more of the embodiments described herein will be provided in connection with FIGS. 5 and 6, respectively.

FIG. 1 is a block diagram of example system 100 for predicting security incidents triggered by security software. The term "security incident," as used herein, generally refers to a computing event caused by human action that may be potentially malicious or have other security implications. As illustrated in FIG. 1, example system 100 may include one or more modules 102 for performing one or more tasks. For example, and as will be explained in greater detail below, example system 100 may include a collection module 104 that collects, by a computing device, telemetry data from a set of security products deployed by a set of client machines. As used herein, the term "telemetry data" generally refers to automatically collected data transmitted from an entity to a receiving device, usually via a network. The term "security product," as used herein, generally refers to a software product that provides functions to monitor and/or defend a computing device against security breaches. Examples of security products may include, without limitation, a firewall, antivirus software, a data loss prevention product, proxy software, variations or combinations of one or more of the same, or any other product that provides security services.

Example system 100 may additionally include an identification module 106 that identifies, by the computing device, a selected security product within the set of security products that is missing telemetry data for a target client machine. Example system 100 may also include a classification module 108 that builds a classifier, by the computing device using the telemetry data, that predicts information about security incidents triggered by the selected security product. The term "classifier," as used herein, generally refers to a mathematical function or algorithm that may utilize patterns in data to categorize observations.

Example system 100 may additionally include a determination module 110 that determines, by the computing device and based on the classifier, that the selected security product triggers a new security incident on the target client machine. Example system 100 may also include a performance module 112 that performs a security action, by the computing device, to secure the target client machine against the new security incident. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or target client machine 208). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate predicting security incidents triggered by security software. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a classifier 122, which may include a function for classifying telemetry data into security incidents, and/or a new security incident 124, which may include a predicted security event for a client device. Database 120 may represent portions of a single database or computing device or a plurality of databases or computing devices. For example, database 120 may represent a portion of computing device 202 and/or target client machine 208 in FIG. 2. Alternatively, database 120 in FIG. 1 may represent one or more physically separate devices capable of being accessed by a computing device, such as computing device 202 and/or target client machine 208 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a target client machine 208 in a set of client machines 206 via a network 204. In one example, all or a portion of the functionality of modules 102 may be performed by computing device 202, set of client machines 206, target client machine 208, and/or any other suitable computing system. Similarly, both target client machine 208 and computing device 202 may be merged into a single machine or computing system such that the functionality of each of modules 102 is provided within a single device.

As will be described in greater detail below, one or more of modules 102 from FIG. 1 may, when executed by at least one processor of computing device 202, enable computing device 202 to predict a security incident based on telemetry data from security products. For example, and as will be described in greater detail below, collection module 104 may collect, by computing device 202, telemetry data 210 from a set of security products deployed by set of client machines 206. Identification module 106 may identify, by computing device 202, a selected security product 212 within the set of security products that is missing telemetry data for target client machine 208. Classification module 108 may build classifier 122, by computing device 202 using telemetry data 210, that predicts information about security incidents triggered by selected security product 212. Determination module 110 may determine, by computing device 202 and based on classifier 122, that selected security product 212 triggers new security incident 124 on target client machine 208. Performance module 112 may perform a security action 214, by computing device 202, to secure target client machine 208 against new security incident 124.

In the example of FIG. 2, and as will be explained in greater detail below, computing device 202 may first receive telemetry data 210 from set of client machines 206 via network 204. Computing device 202 may then determine telemetry data 210 is missing telemetry data for selected security product 212 for target client machine 208. Next, computing device 202 may build classifier 122 for selected security product 212 using telemetry data 210. Computing device 202 may also determine that selected security product 212 triggers new security incident 124 on target client machine 208 based on classifier 122. Finally, computing device 202 may perform security action 214 to send new security incident 124 to a client 218 that uses target client machine 208. Computing device 202 may additionally perform security action 214 to send a product recommendation 216 to client 218.

Computing device 202 and/or machines within set of client machines 206 generally represent any type or form of computing device capable of reading computer-executable instructions. For example, computing device 202 may represent an MSS provider machine running security diagnostics, and target client machine 208 may represent an endpoint device capable of deploying security products. Additional examples of computing device 202 and/or target client machine 208 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Network 204 generally represents any medium or architecture capable of facilitating communication or data transfer. In one example, network 204 may facilitate communication between computing device 202 and set of client machines 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
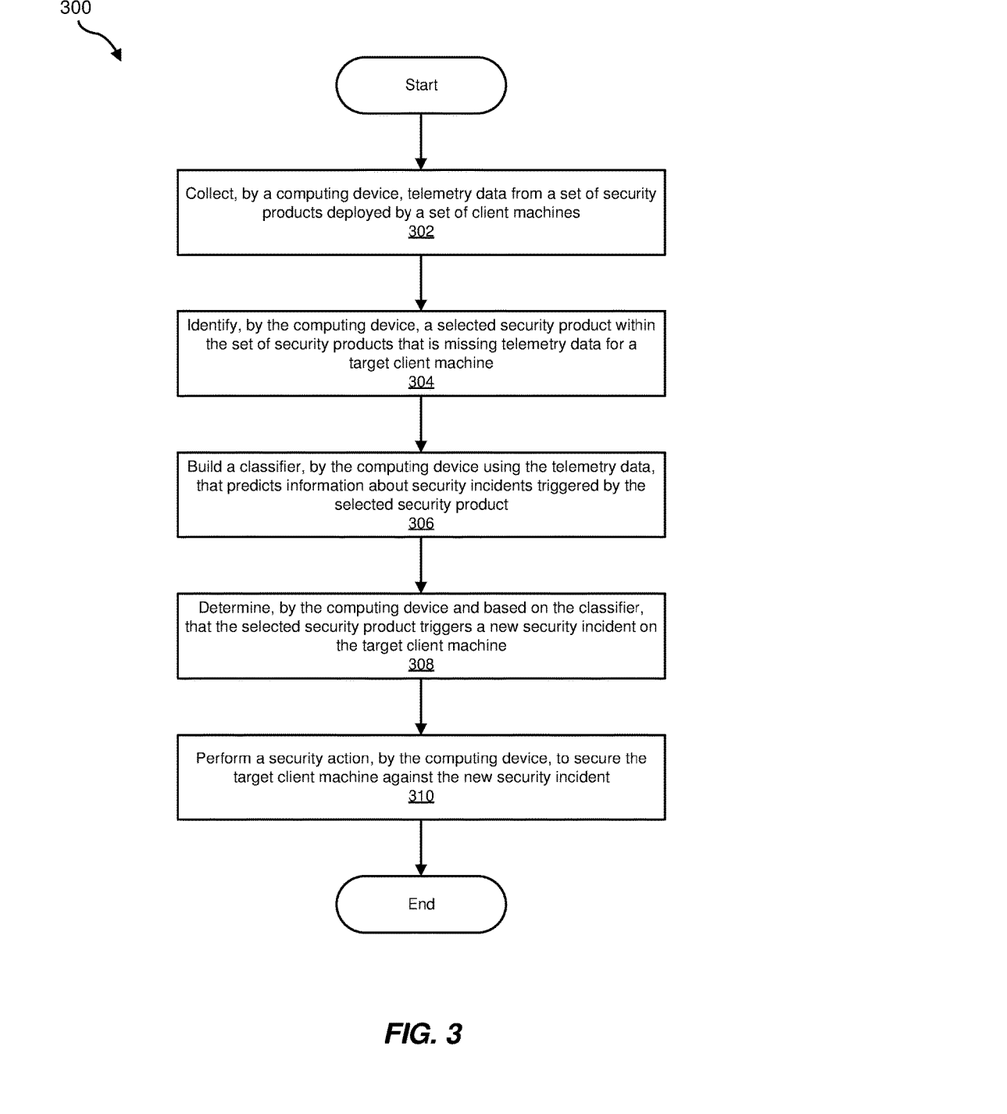
FIG. 3 is a flow diagram of an example method for predicting security incidents triggered by security software.

FIG. 3 is a flow diagram of an example computer-implemented method 300 for predicting security incidents triggered by security software. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may collect, by a computing device, telemetry data from a set of security products deployed by a set of client machines. For example, collection module 104 may, as part of computing device 202 in FIG. 2, collect telemetry data 210 from a set of security products deployed by set of client machines 206.

Collection module 104 may collect telemetry data 210 in a variety of ways. In one embodiment, telemetry data 210 may include a security incident, a type of the security incident, a severity of the security incident, and/or a security signature related to the security incident generated by a security product. The term "security signature," as used herein, generally refers to a description, produced by a security product, of a security event that is detected by the security product. Collection module 104 may then collect telemetry data 210 by receiving telemetry data from each security product deployed by each client machine in set of client machines 206 via network 204. Alternatively, telemetry data 210 may be collected locally from client machines by an alternate computing device and subsequently sent to computing device 202 via network 204.

Returning to FIG. 3, at step 304, one or more of the systems described herein may identify, by the computing device, a selected security product within the set of security products that is missing telemetry data for a target client machine. For example, identification module 106 may, as part of computing device 202 in FIG. 2, identify selected security product 212 that is missing telemetry data for target client machine 208.

Identification module 106 may identify selected security product 212 in a variety of ways. In some examples, client 218 may be interested in a specific security product, such as selected security product 212, and send the selection to computing device 202. In other examples, identification module 106 may determine that telemetry data 210 does not include telemetry data or is otherwise missing some expected telemetry data for selected security product 212 on target client machine 208. In these examples, the missing telemetry data may be due to selected security product 212 not being deployed by target client machine 208 or corrupted or missing telemetry data.

Returning to FIG. 3, at step 306, one or more of the systems described herein may build a classifier, by the computing device using the telemetry data, that predicts information about security incidents triggered by the selected security product. For example, classification module 108 may, as part of computing device 202 in FIG. 2, build classifier 122, using telemetry data 210, that predicts information about security incidents triggered by selected security product 212.

Classification module 108 may build classifier 122 in a variety of ways. In some embodiments, the information about security incidents triggered by selected security product 212 may include whether selected security product 212 would trigger a security incident on a client machine, the type of security incident that would be triggered, and security signatures that may cause the security incident to be triggered. In these embodiments, classification module 108 may build classifier 122 by grouping telemetry data 210 by each security product within the set of security products for each client machine on a single day and training a machine learning model to predict the security incidents in the missing telemetry data. Thus, in these embodiments, a unit of analysis includes all telemetry data within a day for a specific product on a specific client machine.

As used herein, the term "machine learning model" generally refers to a computational algorithm that may learn from data in order to make predictions. Examples of machine learning models may include, without limitation, support vector machines, neural networks, clustering models, decision trees, classifiers, variations or combinations of one or more of the same, and/or any other suitable model. Notably, classification module 108 may train classifier 122 using machine learning methods, such as collaborative filtering and supervised matrix completion, to predict the missing telemetry data for selected security product 212 for target client machine 208 by analyzing telemetry data for other security products and/or other client machines.

In one example, classification module 108 may train the machine learning model by using security signatures from other security products as features, using whether a security incident is triggered by selected security product 212 as a label, and predicting whether the missing telemetry data contains a security incident. The term "feature," as used herein, generally refers to a value or vector derived from data that allows it to be measured and/or interpreted as part of a machine learning method. The term "label," as used herein, generally refers to a descriptive tag that provides information on the classification of data. In the above example, a binary label may be used to represent that a security incident is triggered by selected security product 212 or that no security incident is triggered by selected security product 212 for a client machine on a specific day.

In another example, classification module 108 may train the machine learning model by using security signatures from other security products as features, using a type of security incident as a label, and predicting a type of security incident in the missing telemetry data. In this example, a multi-class label may be used to represent each type of security incident that may be triggered by selected security product 212.

In additional examples, classification module 108 may train the machine learning model by estimating each security signature generated by each security product and predicting a security signature generated by selected security product 212 in the missing telemetry data. In these examples, a multi-class label may be used to represent different security signatures. Classification module 108 may also combine the above examples to train the machine learning model to predict any combination or variation of the above information about security incidents.

Figure 4:
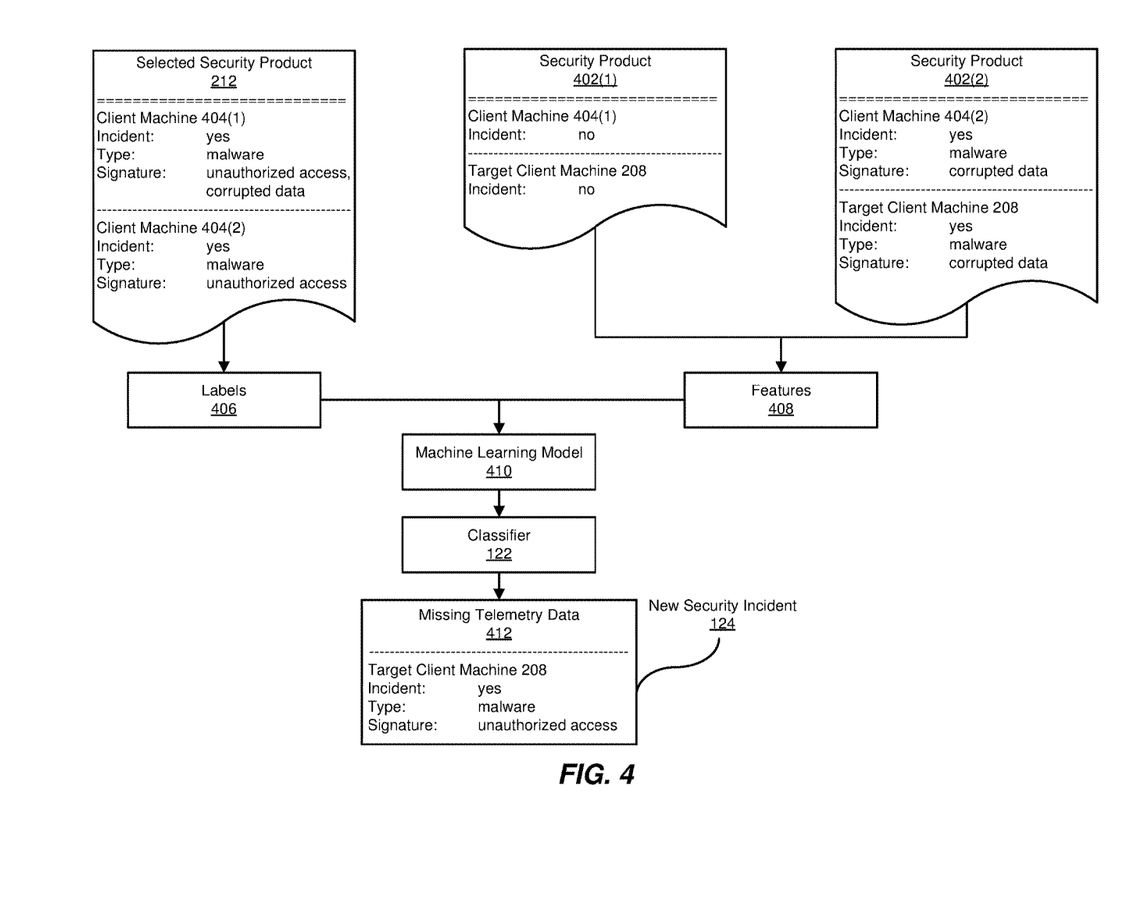
FIG. 4 is a block diagram of an example classifier for predicting an example new security incident.

As illustrated in FIG. 4, telemetry data 210 may include telemetry data for selected security product 212, a security product 402(1), and a security product 402(2). In this example, selected security product 212 may be deployed by a client machine 404(1) and a client machine 404(2), security product 402(1) may be deployed by client machine 404(1) and target client machine 208, and security product 402(2) may be deployed by client machine 404(2) and target client machine 208. Notably, in this example, selected security product 212 may not be deployed by target client machine 208. Information about security incidents triggered by selected security product 212 may be used for labels 406, and information about security incidents triggered by security product 402(1) and security product 402(2) may be used for features 408. Labels 406 and features 408 may then be used to train a machine learning model 410 to build classifier 122 for predicting missing telemetry data 412.

Returning to FIG. 3, at step 308, one or more of the systems described herein may determine, by the computing device and based on the classifier, that the selected security product triggers a new security incident on the target client machine. For example, determination module 110 may, as part of computing device 202 in FIG. 2, determine, based on classifier 122, that selected security product 212 triggers new security incident 124 on target client machine 208.

Determination module 110 may determine that selected security product 212 triggers new security incident 124 in a variety of ways. In one embodiment, determination module 110 may determine that selected security product 212 triggers new security incident 124 by determining that telemetry data 210 does not include new security incident 124 and using classifier 122 to predict new security incident 124 in the missing telemetry data. In this embodiment, new security incident 124 may include a security incident not triggered by selected security product 212 for target client machine 208 but triggered by another security product and/or by selected security product 212 for another client machine with similar attributes. In other embodiments, new security incident 124 may represent a security incident not triggered by any security product within the set of security products deployed by set of client machines 206.

In the example of FIG. 4, determination module 110 may determine that telemetry data 210 does not include security incidents for selected security product 212 for target client machine 208. Determination module 110 may then use classifier 122 to predict new security incident 124 for missing telemetry data 412 for target client machine 208. In this example, new security incident 124 may represent a malware incident that would have been triggered by selected security product 212 if selected security product 212 had been deployed by target client machine 208. Determination module 110 may use classifier 122 to predict the malware incident based on a similarity of security incidents triggered by security product 402(2) for client machine 404(2) and target client machine 208.

Returning to FIG. 3, at step 310, one or more of the systems described herein may perform a security action, by the computing device, to secure the target client machine against the new security incident. For example, performance module 112 may, as part of computing device 202 in FIG. 2, perform security action 214 to secure target client machine 208 against new security incident 124.

Performance module 112 may perform security action 214 in a variety of ways. In some examples, performance module 112 may perform security action 214 by alerting an administrator about new security incident 124 and/or alerting client 218 about new security incident 124. For example, performance module 112 may alert the administrator about the effectiveness and/or accuracy of selected security product 212 in comparison to other security products in triggering security incidents like new security incident 124. Performance module 112 may also alert the administrator about other security products that trigger the same security incident as new security incident 124, which may indicate a severity of new security incident 124. Additionally, performance module 112 may provide client 218 with relevant security signatures that may contribute to new security incident 124 to improve understanding of underlying causes of new security incident 124.

In other examples, performance module 112 may perform security action 214 by deploying selected security product 212 on target client machine 208, and/or providing a security product recommendation, such as product recommendation 216, to client 218. Performance module 112 may also evaluate a usefulness of selected security product 212 for client 218 in product recommendation 216. For example, product recommendation 216 may include a recommendation to deploy selected security product 212 on target client machine 208 to detect security incidents similar to new security incident 124. As another example, product recommendation 216 may include a determination that selected security product 212 provides no additional benefit to other security products deployed by target client machine 208.

As explained above in connection with method 300 in FIG. 3, the disclosed systems and methods may, by creating a classifier using telemetry data from a multitude of security products across multiple client machines, predict security incidents for missing or corrupted data. Specifically, the disclosed systems and methods may train a machine learning model to predict information about a security incident that may be triggered by a security product for a particular client machine. By learning from security signatures generated by various security products, the systems and methods described herein may also discover relationships between security signatures and the resulting security incidents triggered by the security products. The disclosed systems and methods may then determine the potential advantage of deploying a security product for a client device and provide product recommendations to clients.

As detailed above, by building a classifier to predict security incidents that a security product may trigger, the disclosed systems and methods may detect security incidents without actually deploying the security product on a client machine. In addition, by using machine learning methods like matrix completion, the disclosed systems and methods may overcome issues with missing or corrupted data. Thus, the systems and methods described herein may improve the detection and understanding of security incidents for MSS providers and clients.

Figure 5:
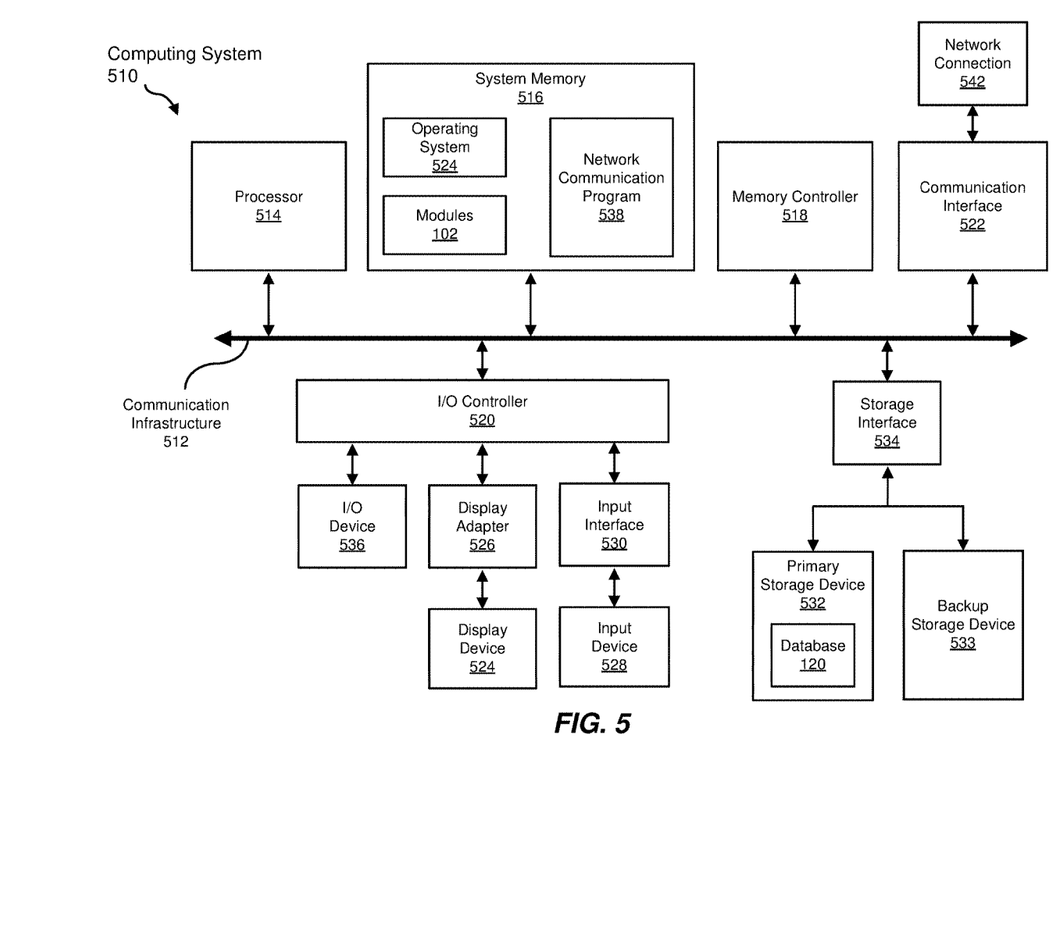
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 524 for execution by processor 514. In one example, operating system 524 may include and/or represent software that manages computer hardware and software resources and/or provides common services to computer programs and/or applications on computing system 510. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application-Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored and/or loaded in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an ASIC adapted to implement one or more of the example embodiments disclosed herein.

Figure 6:
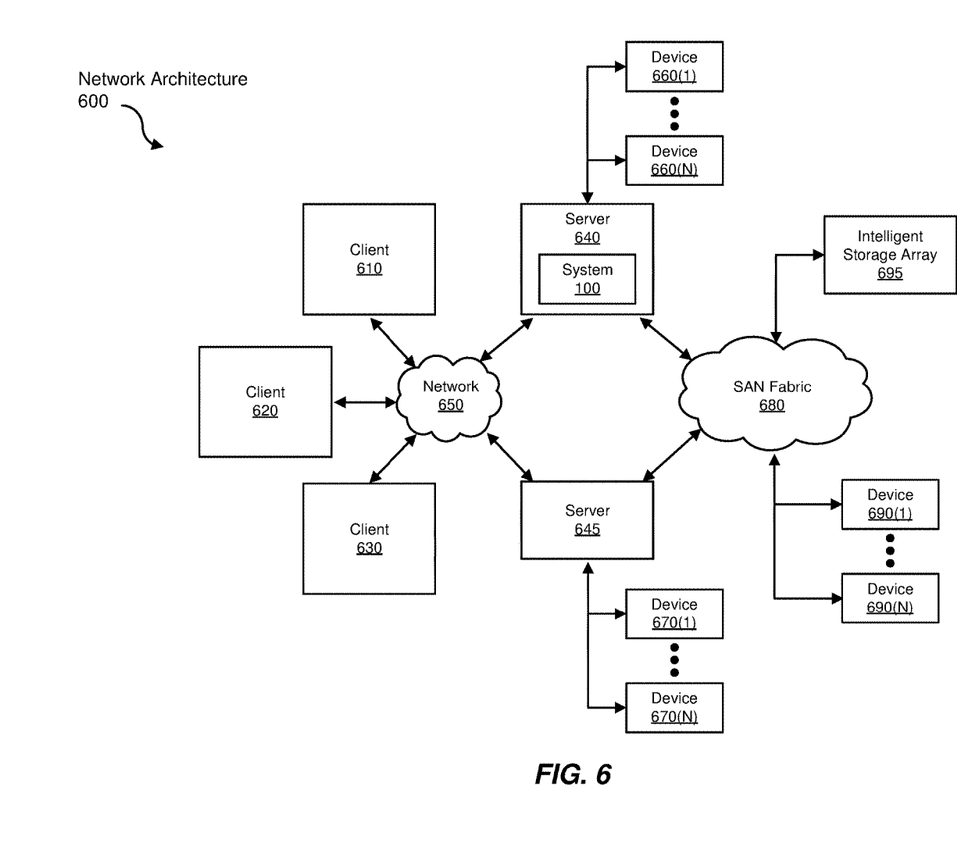
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for predicting security incidents triggered by security software.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive telemetry data to be transformed, transform the telemetry data, output a result of the transformation to a storage or output device, use the result of the transformation to build a classifier, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for predicting security incidents triggered by security software, at least a portion of the method being performed by a computing device comprising at least one processor, the method comprising:

collecting, by the computing device, telemetry data from a set of security products deployed by a set of client machines;

identifying, by the computing device, a selected security product within the set of security products that is missing telemetry data for a target client machine;

building a classifier, by the computing device using the telemetry data, that predicts information about security incidents triggered by the selected security product, wherein the classifier predicts the information in the missing telemetry data by training a machine learning model using security signatures from the telemetry data to predict security incidents;

determining, by the computing device and based on the classifier, that the selected security product triggers a new security incident on the target client machine; and performing a security action, by the computing device, to secure the target client machine against the new security incident.

2. The method of claim 1, wherein the telemetry data comprises at least one of:
a security incident;
a type of the security incident;
a severity of the security incident; and
a security signature related to the security incident generated by a security product.

3. The method of claim 1, wherein building the classifier comprises:
grouping telemetry data by each security product within the set of security products for each client machine on a single day; and
training the machine learning model to predict the security incidents in the missing telemetry data.

4. The method of claim 3, wherein training the machine learning model comprises:
using security signatures from other security products as features;
using a determination of whether a security incident is triggered by the selected security product as a label; and
predicting whether the missing telemetry data contains a security incident.

5. The method of claim 3, wherein training the machine learning model comprises:
using security signatures from other security products as features;
using a type of security incident as a label; and
predicting a type of security incident in the missing telemetry data.

6. The method of claim 3, wherein training the machine learning model comprises:
estimating each security signature generated by each security product; and
predicting a security signature generated by the selected security product in the missing telemetry data.

7. The method of claim 1, wherein determining that the selected security product triggers the new security incident comprises:
determining that the telemetry data does not include the new security incident; and
using the classifier to predict the new security incident in the missing telemetry data.

8. The method of claim 1, wherein performing the security action comprises at least one of:
alerting an administrator about the new security incident;
alerting a client about the new security incident;

deploying the selected security product on the target client machine; and providing a security product recommendation to the client.

9. A system for predicting security incidents triggered by security software, the system comprising:
   a collection module, stored in memory, that collects, by a computing device, telemetry data from a set of security products deployed by a set of client machines;
   an identification module, stored in memory, that identifies, by the computing device, a selected security product within the set of security products that is missing telemetry data for a target client machine;
   a classification module, stored in memory, that builds a classifier, by the computing device using the telemetry data, that predicts information about security incidents triggered by the selected security product, wherein the classifier predicts the information in the missing telemetry data by training a machine learning model using security signatures from the telemetry data to predict security incidents;
   a determination module, stored in memory, that determines, by the computing device and based on the classifier, that the selected security product triggers a new security incident on the target client machine;
   a performance module, stored in memory, that performs a security action, by the computing device, to secure the target client machine against the new security incident; and
   at least one hardware processor that executes the collection module, the identification module, the classification module, the determination module, and the performance module.

10. The system of claim 9, wherein the telemetry data comprises at least one of:
    a security incident;
    a type of the security incident;
    a severity of the security incident; and
    a security signature related to the security incident generated by a security product.

11. The system of claim 9, wherein the classification module builds the classifier by:
    grouping telemetry data by each security product within the set of security products for each client machine on a single day; and
    training the machine learning model to predict the security incidents in the missing telemetry data.

12. The system of claim 11, wherein training the machine learning model comprises:
    using security signatures from other security products as features;
    using a determination of whether a security incident is triggered by the selected security product as a label; and
    predicting whether the missing telemetry data contains a security incident.

13. The system of claim 11, wherein training the machine learning model comprises:
    using security signatures from other security products as features;
    using a type of security incident as a label; and
    predicting a type of security incident in the missing telemetry data.

14. The system of claim 11, wherein training the machine learning model comprises:
    estimating each security signature generated by each security product; and predicting a security signature generated by the selected security product in the missing telemetry data.

15. The system of claim 9, wherein the determination module determines that the selected security product triggers the new security incident by:
    determining that the telemetry data does not include the new security incident; and
    using the classifier to predict the new security incident in the missing telemetry data.

16. The system of claim 9, wherein the performance module performs the security action by at least one of:
    alerting an administrator about the new security incident;
    alerting a client about the new security incident;
    deploying the selected security product on the target client machine; and
    providing a security product recommendation to the client.

17. A non-transitory computer-readable medium comprising one or more computer-executable instructions that, when executed by at least one processor of a computing device, cause the computing device to:
    collect, by the computing device, telemetry data from a set of security products deployed by a set of client machines;
    identify, by the computing device, a selected security product within the set of security products that is missing telemetry data for a target client machine;
    build a classifier, by the computing device using the telemetry data, that predicts information about security incidents triggered by the selected security product, wherein the classifier predicts the information in the missing telemetry data by training a machine learning model using security signatures from the telemetry data to predict security incidents;
    determine, by the computing device and based on the classifier, that the selected security product triggers a new security incident on the target client machine; and
    perform a security action, by the computing device, to secure the target client machine against the new security incident.

18. The non-transitory computer-readable medium of claim 17, wherein the telemetry data comprises at least one of:
    a security incident;
    a type of the security incident;
    a severity of the security incident; and
    a security signature related to the security incident generated by a security product.

19. The non-transitory computer-readable medium of claim 17, wherein the computer-executable instructions cause the computing device to build the classifier by:
    grouping telemetry data by each security product within the set of security products for each client machine on a single day; and
    training the machine learning model to predict the security incidents in the missing telemetry data.

20. The non-transitory computer-readable medium of claim 19, wherein training the machine learning model comprises:
    using security signatures from other security products as features;
    using a determination of whether a security incident is triggered by the selected security product as a label; and predicting whether the missing telemetry data contains a security incident.

\* \* \* \* \*